US009031329B1

(12) United States Patent
Farid et al.

(10) Patent No.: US 9,031,329 B1
(45) Date of Patent: May 12, 2015

(54) PHOTO FORENSICS USING IMAGE SIGNATURES

(71) Applicant: Fourandsix Technologies, Inc., San Jose, CA (US)

(72) Inventors: Hany Farid, White River Junction, VT (US); Kevin Connor, San Jose, CA (US)

(73) Assignee: Fourandsix Technologies, Inc., San Jose, CA (US)

( * ) Notice: Subject to any disclaimer, the term of this patent is extended or adjusted under 35 U.S.C. 154(b) by 10 days.

(21) Appl. No.: 13/782,032

(22) Filed: Mar. 1, 2013

Related U.S. Application Data

(60) Provisional application No. 61/641,636, filed on May 2, 2012.

(51) Int. Cl.
*G06K 9/68* (2006.01)
*G06K 9/62* (2006.01)

(52) U.S. Cl.
CPC .................................. *G06K 9/6201* (2013.01)

(58) Field of Classification Search
USPC ................... 348/161; 382/209, 218; 714/732, 714/E11.175; 725/19
See application file for complete search history.

(56) References Cited

U.S. PATENT DOCUMENTS 8,160,293 B1 * 4/2012 Fridrich et al. ............... 382/100
2012/0087589 A1 * 4/2012 Chang-Tsun et al. ........ 382/190

OTHER PUBLICATIONS

Kee et al., "Digital Image Authentication from JPEG Headers", IEEE Transactions on Information Forensics and Security, 2011.*
J. Lukas and J. Fridrich. Estimation of primary quantization matrix in double compressed JPEG images. In Digital Forensic Research Workshop, Cleveland, Ohio, Aug. 2003.*
Kee et al., "Digital Image Authentication from Thumbnails", SPIE Symposium on Electronic Imaging, 2010, San Jose, CA.
Hany Farid, "Digital Image Ballistics from JPEG Quantization", Technical Report, 2006,TR2006-583, Dartmouth College, Computer Science.
Hany Farid, "Digital Image Ballistics from JPEG Quantization: A Followup Study", Technical Report, 2008, TR2008-638, Dartmouth College, Computer Science.
Jesse D. Kornblum, "Using JPEG Qauntization Tables to Identify Imagery Processed by Software", Digital Investigation, 2008, pp. S21-S25, Elsevier Ltd.

* cited by examiner

*Primary Examiner* — Gregory F Cunningham
(74) *Attorney, Agent, or Firm* — Van Pelt, Yi & James LLP

(57) ABSTRACT

Evaluating an image is disclosed. A plurality of attributes of the image is analyzed. A determination is made that a portion of the attributes of the image imperfectly matches a reference attribute signature corresponding to a device. It is distinguished whether the imperfect match likely corresponds to a modification of the image.

25 Claims, 7 Drawing Sheets

| ROW # | # SIGS | DIMENSION ANY | DIMENSION SAME | COMPRESSION ANY | COMPRESSION SAME | THUMBNAIL ANY | THUMBNAIL SAME | METADATA ANY | METADATA SAME | CAMERA MATCH | SOFTWARE MATCH | UNEXPECTED CREATOR TOOL | UNEXPECTED DATE | RELIABLE | DYNAMIC |
|---|---|---|---|---|---|---|---|---|---|---|---|---|---|---|---|
| 1 | | | | NO | | | | | | NO | YES | | YES | | |
| 2 | | | | NO | | | | | | NO | YES | YES | | | |
| 3 | | | | NO | | | | | | NO | YES | | | | |
| 4 | ONE | | YES | | YES | | YES | | YES | | | | NO | | |
| 5 | ONE | | YES | | YES | | YES | | | | | | NO | | |
| 6 | ONE | | YES | | YES | | | | | NO | | | | | |
| 7 | ONE | | YES | YES | | | YES | | YES | | | | NO | | YES |
| 8 | ONE | NO | | | | | YES | | | NO | | | | YES | |
| 9 | ONE | | YES | | | | YES | | YES | NO | | | NO | | YES |
| 10 | ALL | | NO | | NO | | | | | NO | | | | YES | |
| 11 | | | | | | | | | | YES | | | NO | | |
| 12 | | | | | | | | | | | | | | NO | |
| 13 | | | | | | | | | | | | | | YES | YES |

FIG. 5

| ROW # | INSIGHT | REASON |
|---|---|---|
| 1 | (1) PROBABLY A MODIFIED IMAGE | THE IMAGE COMPRESSION MATCHES A KNOWN SOFTWARE APPLICATION AND THERE IS AN UNEXPECTED EXIF MODIFICATION DATE. |
| 2 | (2) PROBABLY A MODIFIED IMAGE | THE IMAGE COMPRESSION MATCHES A KNOWN SOFTWARE APPLICATION AND THERE IS AN UNEXPECTED EXIF CREATORTOOL. |
| 3 | (3) MAY BE A MODIFIED IMAGE | THE IMAGE COMPRESSION MATCHES NO KNOWN SIGNATURE, BUT DOES MATCH A KNOWN SOFTWARE APPLICATION. |
| 4 | (4) MAY BE AN UNTOUCHED ORIGINAL | SINGLE SIGNATURE MATCHED ON ALL BUT METADATA. MATCH FOR METADATA FOUND ON ANOTHER SIGNATURE. |
| 5 | (5) MAY BE AN UNTOUCHED ORIGINAL | SINGLE SIGNATURE MATCHED ON ALL BUT METADATA. |
| 6 | (6) MAY BE AN UNMODIFIED ORIGINAL THAT WAS TOUCHED BY A PHOTO MANAGEMENT APPLICATION | SINGLE SIGNATURE MATCHED FOR BOTH IMAGE DIMENSIONS AND COMPRESSION. |
| 7 | (7) MAY BE AN UNTOUCHED ORIGINAL | THOUGH EXACT SIGNATURE MATCH NOT FOUND, SIGNATURES ON THIS CAMERA ARE HIGHLY VARIABLE, AND THIS SIGNATURE SEEMS PLAUSIBLE. |
| 8 | (8) IMAGE MAY HAVE BEEN CROPPED ON THE CAMERA | SINGLE SIGNATURE MATCHES BOTH COMPRESSION AND THUMBNAIL, BUT NOT DIMENSIONS, AND THERE IS RELATIVELY COMPLETE SIGNATURE COVERAGE FOR THIS CAMERA. |
| 9 | (9) DIFFICULT TO DRAW CONCLUSION | SIGNATURE MATCHES ON ALL BUT COMPRESSION, BUT THAT IS KNOWN TO BE HIGHLY VARIABLE ON THIS CAMERA. |
| 10 | (10) MAY BE A MODIFIED IMAGE | NO KNOWN SIGNATURE MATCHES BOTH DIMENSIONS AND COMPRESSION, AND THERE IS RELATIVELY COMPLETE SIGNATURE COVERAGE FOR THIS CAMERA. |
| 11 | (11) MAY BE AN UNTOUCHED ORIGINAL | THOUGH EXACT SIGNATURE MATCH NOT FOUND FOR THIS CAMERA, AN EXACT MATCH WAS FOUND ON A CAMERA FROM THE SAME MANUFACTURER. |
| 12 | (12) DIFFICULT TO DRAW CONCLUSION | OUR LEVEL OF SIGNATURE COVERAGE FOR THIS CAMERA IS LIKELY INCOMPLETE. |
| 13 | (13) DIFFICULT TO DRAW CONCLUSION | RESULTS OF THE SIGNATURE ANALYSIS DO NOT FOLLOW ANY TYPICAL PATTERNS. |

FIG. 5 (Cont.)

PHOTO FORENSICS USING IMAGE SIGNATURES

CROSS REFERENCE TO OTHER APPLICATIONS

This application claims priority to U.S. Provisional Patent Application No. 61/641,636 entitled PHOTO FORENSICS FROM JPEG SIGNATURES filed May 2, 2012 which is incorporated herein by reference for all purposes.

BACKGROUND OF THE INVENTION

Recent advances in computational photography, computer vision, and computer graphics allow for the creation of visually compelling photographic fake images. The resulting undermining of trust in photographic images impacts law enforcement, national security, the media, advertising, e-commerce, and more. The field of photo forensics has emerged to help determine whether a photographic image has been manipulated. Often, techniques in photo forensics operate on the assumption that most forms of tampering will disturb some property of an image. To the extent that these perturbations can be quantified and detected, they may be used to objectively invalidate a photo. Therefore, there exists a need for effective tools to assist in the detection of manipulations to photographs.

BRIEF DESCRIPTION OF THE DRAWINGS

Various embodiments of the invention are disclosed in the following detailed description and the accompanying drawings.

FIG. 5 is a table outlining an example set of match rules/patterns used to perform imperfect match analysis.

DETAILED DESCRIPTION

Figure 1:
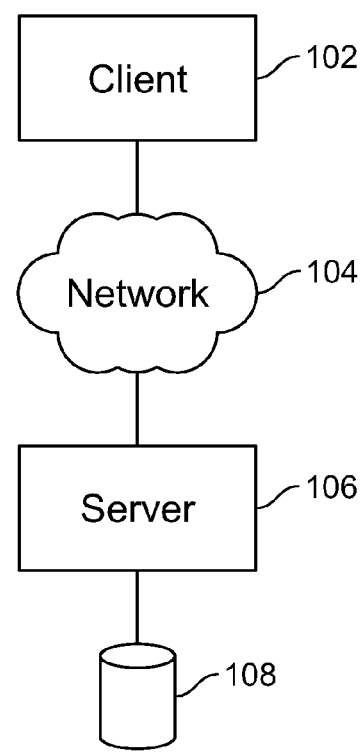
FIG. 1 is a block diagram illustrating an embodiment of a system for analyzing an image.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

There exists a large possibility of how compression (e.g., JPEG) and file format (e.g., EXIF) standards and other image parameters can be implemented. Every hardware and software developer must make a series of choices in implementing support for these standards, and these choices result in a relatively distinct set of detectable image attribute variations for each hardware and software product. A signature of an image can be determined to summarize the choices that hardware/software product developers have made for the image. Often the set of possible signatures for images generated by a hardware/software product is limited. For example, when an image is first captured and stored in the camera, it carries one of the signatures that are characteristic of that particular camera model. Later, if the file storing the image is modified and then resaved from a software application or an online service, the resulting file will carry the signature of that software application or service, and at least a portion of the original camera signature is likely lost. However, even though the signature may have changed, the image metadata generally continues to list the name of the device that was used to capture the image.

In some embodiments, a signature of an image being analyzed can be determined and compared to reference signatures in a database for the device identified in the metadata of the image. The database (e.g., continuously updated) may store reference signatures (e.g., signatures associated with unmodified original images created by a device/software) for a plurality of devices and software products. If a match is found, then it is generally safe to assume that the image has not been modified since it left the capture device.

Evaluating an image is disclosed. For example, a digital image is analyzed to determine whether the image represents data that has been directly generated by a camera without manipulation (e.g., original unmodified image). In some embodiments, a plurality of attributes of an image is analyzed. For example, dimensions of the image, compression utilized to create the image, properties of a thumbnail associated with the image, and/or metadata of the image is analyzed. For example, a signature of the image is determined using the attributes of the image. It is determined whether one or more of the image attributes imperfectly match an attribute signature. For example, the attributes of the image (e.g., using a signature determined from attributes of the image) are compared to a database of reference attribute signatures that include signatures associated with original unmodified images captured by cameras covered by the database. The database of reference attribute signatures may be generated by utilizing trusted images gathered from known cameras. In the event it is determined that attributes of the image imperfectly match a reference attribute signature, it is determined whether the imperfect match likely corresponds to an image modification. In some embodiments, if it is determined that the image may not be an unmodified original image, information regarding one or more reasons the image may not be an unmodified original image is provided. For example, an attribute (e.g., image dimensions) of the image that indicates that the image is likely not an original unmodified image (e.g., camera used to take the image does not include a setting to capture an image with such dimensions) is provided. In some embodiments, although it is indicated that an analyzed image is likely not an original unmodified image, the image has not been modified but simply resaved.

In some cases, due to the high variability of attribute signatures and the ever increasing release of new cameras, attributes of an unmodified original image may not perfectly match a reference attribute signature in a database due to a missing reference signature. A user that has been provided the information regarding an attribute and/or reason indicating that the image may not be an unmodified original image may utilize the provided information as a factor in making an assessment as to whether the image is an unmodified original image.

FIG. 1 is a block diagram illustrating an embodiment of a system for analyzing an image. Client 102 is connected to server 106 via network 104. Examples of client 102 include a desktop computer, a laptop computer, a tablet computer, a mobile device, and any other type of computer. In some embodiments, client 102 at least in part hosts a program utilized to analyze an image. For example, client 102 executes a user program that can be used to analyze an image. Examples of the user program include a dedicated program for image analysis, an image editing program, an image management program, and an image authentication program. In some embodiments, a plug-in to a user program is utilized to analyze an image. For example, FourMatch plug-in by Fourandsix Technologies, Incorporated of San Jose, Calif. for Photoshop (R) software by Adobe Systems Incorporated of San Jose, Calif. is utilized to analyze an image.

In some embodiments, the image to be analyzed is provided by a user utilizing client 102. For example, a user selects an image stored on a storage device or medium accessible by client 102. In some embodiments, the image to be analyzed is obtained via network 104. For example, an image to be analyzed is obtained via the Internet (e.g., image on a webpage). In some embodiments, client 102 hosts a program such as a web browser that can assess a service to analyze an image. For example, client 102 executes a program utilized to assess a software-as-a-service application hosted on a server such as server 106 and assessable via a network such as network 104. In another example, client 102 executes a web browser utilized to assess a web application and/or a web page that can be utilized to analyze an image. The image to be analyzed may be uploaded to a website and the website provides information that can be used to verify the authenticity of the image. Server 106 is connected to storage 108. Although FIG. 1 shows storage 108 directly connected to server 106, in some embodiments, storage 108 is accessed by server 106 via network 104. In some embodiments, storage 108 includes one or more reference attribute signatures that correspond to valid attributes associated with possible images generated by a known image device/software. For example, storage 108 includes a database of valid attribute signatures associated with one or more image capture devices covered by the database. The attribute signatures included in the storage may be generated by analyzing output images generated by one or more devices/software using various possible camera/image output settings.

In some embodiments, an image provided by a user of client 102 is analyzed using a program (e.g., user program and/or a plugin) at least in part executed on client 102. The program may process the user image to determine one or more attributes of the image and the determined attributes are compared with one or more reference attribute signatures to determine whether the image attributes have been modified to determine whether it is likely an unmodified original image. The reference attribute signatures may be obtained from storage 108 via network 104 and/or via server 106. One or more reference signatures may be obtained from storage 108 periodically, on a prescribed basis and/or dynamically. For example, client 102 maintains its own database of reference attribute signatures and the database of client 102 is updated as reference attribute signatures are stored in storage 108. In another example, client 102 requests to server 106 reference signatures associated with a camera identified in the metadata of the image to be analyzed and server 106 provides any appropriate reference signature to client 102. In some embodiments, client 102 provides one or more of the determined attributes of the image being analyzed to server 106 via network 104 and server 106 compares the received attributes with information stored in storage 108. The result of the comparison may be provided to client 102.

In some embodiments, client 102 provides an image to be analyzed to server 106 via network 104. Server 106 may process the received image to determine one or more attributes of the image and the determined attributes are compared with one or more reference attribute signatures (e.g., stored in storage 108) to determine whether the image attributes have been modified to determine whether it is likely an unmodified original image. A result of the comparison may be provided to client 102.

In some embodiments, an image signature determined by client 102 is provided to server 106 and/or storage 108 via network 104. The provided signature may be utilized to update and/or add one or more reference signatures to storage 108.

Examples of network 104 include one or more of the following: a direct or indirect physical communication connection, mobile communication network, Internet, intranet, Local Area Network, Wide Area Network, Storage Area Network, and any other form of connecting two or more systems, components, or storage devices together. In various embodiments, the components shown in FIG. 1 may exist in various combinations of hardware machines. One or more of the components shown in FIG. 1 may be included in the same machine. Other communication paths may exist and the example of FIG. 1 has been simplified to illustrate the example clearly. Although single instances of components have been shown to simplify the diagram, additional instances of any of the components shown in FIG. 1 may exist. For example, multiple clients may be communicating with multiple servers that may be utilizing a cluster of storages. Components not shown in FIG. 1 may also exist.

Figure 2:
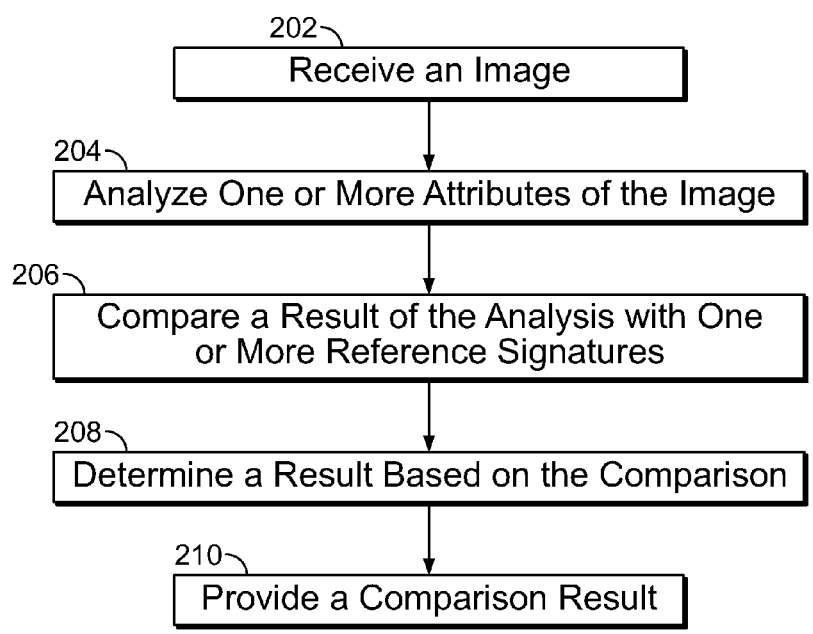
FIG. 2 is flowchart illustrating an embodiment of a process for analyzing an image.

FIG. 2 is flowchart illustrating an embodiment of a process for analyzing an image. The process of FIG. 2 may be at least in part implemented in client 102 and/or server 106 of FIG. 1.

At 202, an image is received. In some embodiments, receiving the image includes receiving an image to be analyzed to determine whether the image is likely an unmodified original image. In some embodiments, receiving the image includes receiving a location identifier of the image. For example, a file system location, a network location, a URL and/or an image identifier is received. Using the image identifier, contents of the image may be obtained. If the image cannot be located, an error message may be provided. In some embodiments, receiving the image includes receiving contents of the image. For example, an image file is received.

At 204, one or more attributes of the image are analyzed. In some embodiments, analyzing one or more attributes of the image includes determining one or more attributes of the image. For example, one or more of the following is determined: size of the image (e.g., pixel dimensions), compression setting used to represent the image, attributes (e.g., size, compression setting, etc.) associated with the thumbnail of the image, and metadata associated with the image (e.g., file attributes such as EXIF metadata, date of file modification, and creation). In some embodiments, analyzing one or more attributes of the image includes determining a signature of the image using a result of one or more analyses of the one or more attributes of the image. For example, the results of the attribute analysis are stored in a data structure representing a signature of the image. This signature may be used to compare the signature with other reference signatures.

In some embodiments, analyzing one or more attributes of the image includes determining the number of times the image has been compressed and/or whether the image has been compressed more than one time. For example, a digital manipulation may require that an image is loaded into an image-editing software and re-saved. In this scenario, the manipulated image has been compressed at least twice. In some embodiments, when an image that has been compressed using a JPEG codec is compressed again after being edited, it can be determined that the image has been compressed more than one time. Because of the lossy nature of the JPEG image format, compressing an image multiple times may introduce specific artifacts not present in singly compressed images. The presence of these artifacts can be used as evidence of some manipulation. These artifacts may manifest themselves in specific patterns in the distribution of DCT coefficients that can be characterized as a non-regular distribution of DCT values. In some embodiments, the number of times the image has been compressed is determined. In some embodiments, it is determined whether the image has been compressed more than one time. In some embodiments, a result of determining the number of times the image has been compressed and/or whether the image has been compressed more than one time is used at least in part to determine whether an image has been likely modified. For example, a result identifying a number of times the image has been compressed and/or whether the image has been compressed more than one time is provided in addition to the comparison result provided in 210 to assist a user in determining whether the image is likely an unmodified original image. In various embodiments, the process of determining the number of times the image has been compressed and/or whether the image has been compressed more than one time may be utilized independent of the process of FIG. 2. For example, attributes of an image are analyzed to determine the number of times the image has been compressed and/or whether the image has been compressed more than one time in a process different from the process of FIG. 2. In some embodiments, if it is determined that the image has been compressed more than one time, the process of FIG. 2 ends and a result associated with this determination is provided.

At 206, a result of the analysis is compared with one or more reference signatures. In some embodiments, comparing the result of the analysis includes determining whether at least a portion of the result matches one or more reference signatures in a database of reference signatures. For example, reference signatures from a storage such as storage 108 of FIG. 1 are searched to identify any reference signature that matches one or more portions of the result of the analysis in 204. For example, it is determined whether a reference signature matches an image signature determined as the result of the analysis. If a matching reference signature cannot be found, one or more reference signatures that match one or more specified combinations of portions of the result of the analysis may be determined, if applicable. For example, it is determined whether any reference signature matches various combinations of one or more components of a signature of the image being analyzed. The various combinations of one or more components may be predetermined in an ordered grouping of combination patterns (e.g., combination pattern of image attributes that must match and image attributes that do not need to match) and the combination patterns are matched in a predetermined order until a matching combination is found. In some embodiments, a signature of the image is compared with a determined subset of a group of reference signatures. For example, only reference signatures associated with the same camera model and/or manufacturer as the image capture device identified in the metadata of the image is utilized in the comparison.

At 208, a result based on the comparison is determined. In some embodiments, determining the result includes determining whether a matching reference signature has been found. For example, if a matching reference signature has been found in 206, it is determined that the received image is likely an unmodified original image. In some embodiments, determining the result includes identifying a result corresponding to portions of the attributes of the image that match and do not match reference signatures. For example, when a single complete matching reference signature cannot be identified, a comparison result corresponding to matching reference signature portions are determined. By identifying which attribute of the received image causes the signature to match or not match at least a portion of a reference signature, a user may use that information to determine whether the image is likely an unmodified original image. In some embodiments, determining the result of the comparison includes determining a reason why a matching reference signature cannot be identified. In some embodiments, determining the result of the comparison includes determining a degree of likelihood the received image is an unmodified authentic image. For example, an image is labeled as green (e.g., image is likely an unmodified authentic image), yellow (e.g., image is potentially a modified image), or red (e.g., image is likely a modified image).

At 210, a comparison result is provided. In some embodiments, providing the comparison result includes visually providing an indication of the determined comparison result. For example, the degree of likelihood the received image is an unmodified original image is visually displayed. In some embodiments, providing the comparison result includes identifying an attribute of the image that likely indicates the image has been modified. In some embodiments, providing the comparison result includes identifying which portion of a signature of the image matches which portions of which reference signature(s). In some embodiments, providing the result includes providing at least a portion of the image attributes analyzed in 204. In some embodiments, providing the comparison result includes providing the result in a user interface display. For example, the result is displayed in a window of an image management and editing program such as Photoshop (R). In some embodiments, providing the comparison result includes providing the result via a network such as network 104 of FIG. 1.

In some embodiments, a result of determining the number of times the image has been compressed and/or whether the image has been compressed more than one time is provided. In some embodiments, a result identifying a number of times the image has been compressed and/or whether the image has been compressed more than one time (e.g., determined at 204) is provided in addition to the comparison result to assist a user in determining whether the image is likely an unmodified original image. For example, an image may have been altered in a manner that preserves the original signature properties of the image (e.g., a signature of the modified image produces a match with a reference signature) but the image is identified to be likely a modified image because the image is determined to have been compressed multiple times.

Figure 3:
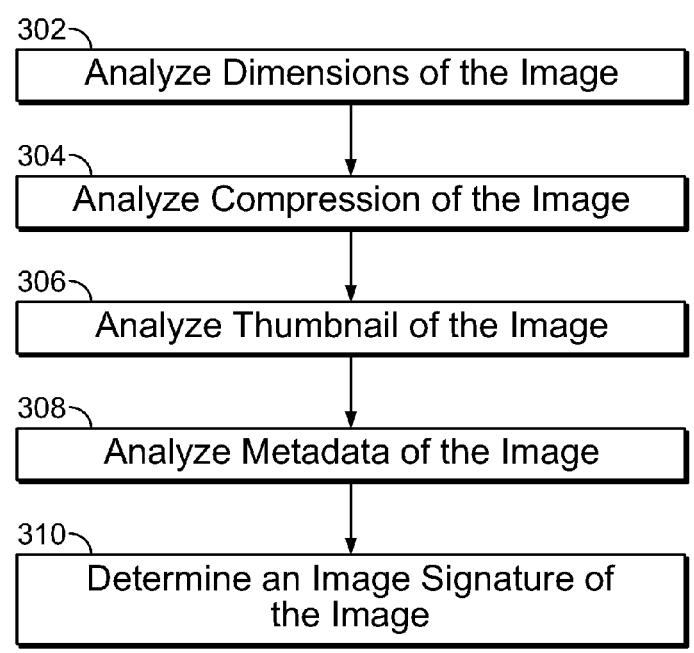
FIG. 3 is flowchart illustrating an embodiment of a process for analyzing attributes of an image.

FIG. 3 is flowchart illustrating an embodiment of a process for analyzing attributes of an image. The process of FIG. 3 may be at least in part implemented in client 102 and/or server 106 of FIG. 1. In some embodiments, the process of FIG. 3 is included in step 204 of FIG. 2.

At 302, dimensions of the image are analyzed. In some embodiments, analyzing the dimensions of the image includes determining pixel dimensions and/or size dimensions of an image to be analyzed. The dimensions of the image may be associated with a sensor resolution and/or an image size setting specific to a capture device/software used to produce the image. By analyzing the dimension of the image, it may be determined whether the dimensions of the image conform to dimensions of an image that has not been modified after being captured by a device/software. Although image dimensions are not unique to a device/software, they do vary from different devices/software, and each device/software often has a fixed set of possible image sizes. For example, when an image does not conform to the dimensions that can be captured on-camera, then it is likely that the image has been modified in some way. In some embodiments, the analyzing the dimensions includes storing the dimension as a component of a signature of the image. For example, components of the dimensions of the image are ordered (e.g., smaller dimension followed by the larger dimension to standardize differences between image orientation) and stored in a data structure.

At 304, compression of the image is analyzed. In some embodiments, analyzing the compression includes determining compression type, format, value, and/or setting used to compress the image.

In some embodiments, analyzing the compression includes analyzing JPEG compression of the image. Typically to compress an image using JPEG compression, a three channel color (RGB) image is first transformed from RGB into luminance/chrominance space (YCbCr). The two chrominance channels (CbCr) are typically subsampled by a factor of two relative to the luminance channel (Y). Each channel is then partitioned into 8×8 pixel blocks. These values may be converted from unsigned to signed integers. Each block may be converted to frequency space using a 2-D discrete cosine transform (DCT). Depending on the specific frequency and channel, each DCT coefficient may be quantized by a different amount.

With some variations, the above sequence of compressing an image is employed by many JPEG compression encoders. The typical source of variation in these encoders includes the choice of quantization values. The quantization is specified as a set of three 8×8 tables associated with each frequency and image channel (YCbCr). For low compression rates, the values in these tables tend towards 1 and increase for higher compression rates. After quantization, the DCT coefficients are subjected to entropy encoding (typically Huffman coding). Huffman coding includes a variable-length encoding scheme that encodes frequently occurring values with shorter codes, and less frequently occurring values with longer codes. This lossless compression scheme exploits the fact that the quantization of DCT coefficients yields many zero coefficients, which can in turn be efficiently encoded. Motivated by the fact that the statistics of the DC and AC DCT coefficients are different, the JPEG compression standard allows for different Huffman codes for the DC and AC coefficients. This entropy encoding is applied separately to each YCbCr channel, employing separate codes for each channel.

Because the JPEG standard does not enforce any specific quantization table or Huffman code, camera and software engineers are therefore free to balance compression and quality to desired levels. The specific quantization tables and Huffman codes needed to decode a JPEG file are typically included in the JPEG header of an image. Specific quantization table or Huffman code may be specific to a specific camera, camera manufacturer, and/or image management/editing software and by identifying the quantization table or Huffman code, the camera model, camera manufacturer, and/or software used to create/edit the image may be determined.

In some embodiments, analyzing the compression of the image includes determining the quantization table and Huffman code of the image. In some embodiments, the quantization table and Huffman code of the image are obtained from the JPEG header of the image. The file of the image is processed to obtain a set of three 8×8 quantization tables specified as a one dimensional array of 192 values (e.g., each channel's table is specified in column-order, and the three tables are specified in the order of luminance (Y), chrominance (Cb) and chrominance (Cr)) and a set of Huffman code specified as six sets of 15 values corresponding to the number of codes of length 1 through 15 (e.g., each of three channels requires two codes, one for the DC coefficients and one for the AC coefficients). Although the example described above describes JPEG image compression, other compression types, formats, and/or settings may be analyzed in 304. In some embodiments, the analyzing the compression includes storing the compression data as a component of a signature of the image. For example, compression settings (e.g., quantization tables and Huffman codes) are stored in a data structure of the signature.

At 306, a thumbnail of the image is analyzed. In some embodiments, analyzing the thumbnail of the image includes determining properties of a thumbnail image, if applicable, associated with the image. Typically for an image such as an image compressed using the JPEG format, a thumbnail version of the full resolution image is typically embedded in a JPEG header of the image. The thumbnail image may be created by cropping, filtering and down-sampling the full-resolution image, and the image is then typically compressed and stored in the header of the image. In some embodiments, analyzing the thumbnail includes determining whether image is associated with a thumbnail. For example, a header included in the image is analyzed to determine whether the file of the image includes a thumbnail. In some embodiments, analyzing the thumbnail includes determining dimensions of the thumbnail. For example, pixel dimensions and/or size dimensions of the thumbnail of the image are determined. In some embodiments, analyzing the thumbnail includes analyzing the compression utilized to compress the thumbnail. For example, compression type, format, value, and/or setting used to compress the thumbnail of the image is determined. In the example of a JPEG compression utilized to compress the thumbnail, quantization tables and Huffman codes utilized to compress the thumbnail are determined. In some embodiments, the analyzing the thumbnail includes storing the thumbnail data as one or more components of a signature of the image. For example, thumbnail dimensions (e.g., ordered dimensions component values) and compression settings/values (e.g., quantization tables and Huffman codes) are stored in a data structure of the signature. In some embodiments, if a thumbnail is not associated with the image, a predetermined value (e.g., a zero value) may be stored as one or more components of a signature of the image.

At 308, metadata of the image is analyzed. In some embodiments, analyzing the metadata of the image includes determining Exchangeable image file format (i.e., EXIF) data of the image. For example, a file of the image is processed to determine EXIF data included in the JPEG header of the image. In some embodiments, determining the EXIF data includes analyzing contents of image file directories (i.e., IFDs) including (1) Primary, (2) EXIF, (3) Interoperability, (4) Thumbnail and (5) GPS as specified in the EXIF standard. Because device manufacturers are free to embed any (or no) information into each IFD, the type and/or amount of data included in each IFD may be utilized to identify a specific camera used to generate the image. For example, the number of entries in each IFD may be determined and used as one or more components of a signature of the image.

In some embodiments, a metadata tag of the image may identify devices/software used to create and/or modify the image. For example, the EXIF metadata of the image may include a "CreatorTool" metadata tag and an associated value that identifies a hardware/software tool used to create, modify and/or save the image. If the image was modified and saved by a software tool, a value field of the "CreatorTool" metadata may be overwritten to identify the software tool used to save the image. In some embodiments, information identifying software used to create/modify/save the image is stored as one or more components of a signature of the image.

In some embodiments, determining the metadata of the image includes determining one or more dates associated with the image. For example, a file storing the image may indicate (e.g., in the EXIF metadata) when the file/image was created, modified, and/or accessed. If the file creation data is different from the file modification date, it may be determined that the image is possibly not an unmodified original image. The file date information may be stored as one or more components of a signature of the image.

At 310, an image signature of the image is determined. In some embodiments, determining the image signature includes combining one or more results of analyses performed in steps 302-308 in the data structure. For example, values (e.g., 284 values from the header of the image, 284 values from the thumbnail of the image and 5 values from EXIF metadata of the image to form 573 values included in the image signature) determined in steps 302-308 are gathered together to form the image signature. In some embodiments, the image signature includes an identifier of a camera make and model from an EXIF metadata of the image. The determined image signature may be used to compare against reference image signatures that correspond to unmodified original images to determine whether the image is likely an unmodified original image.

Figure 4:
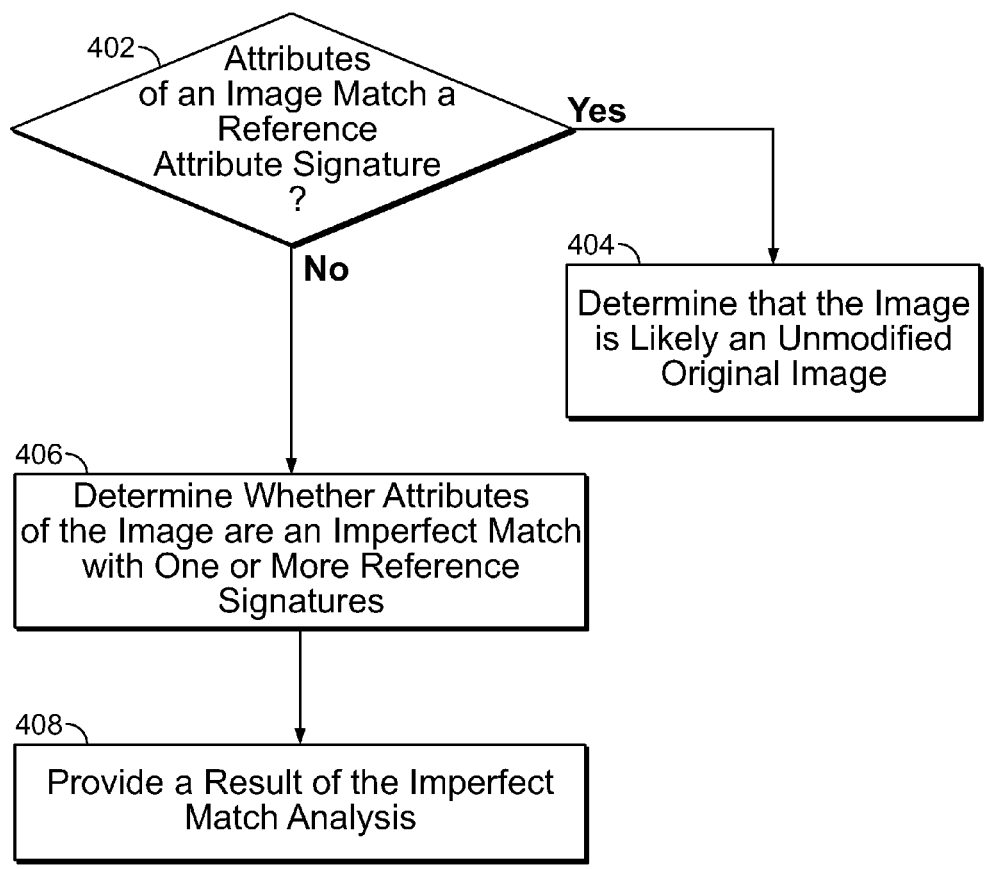
FIG. 4 is a flowchart illustrating an embodiment of a process for comparing attributes of an image against a reference image signature.

FIG. 4 is a flowchart illustrating an embodiment of a process for comparing attributes of an image against a reference image signature. The process of FIG. 4 may be at least in part implemented in client 102 and/or server 106 of FIG. 1. In some embodiments, the process of FIG. 4 is included in step 206 of FIG. 2.

At 402, it is determined whether attributes of an image match a reference attribute signature. In some embodiments, the image is the image analyzed in the process of FIG. 2. In some embodiments, determining whether attributes of the image match the reference attribute signature includes comparing at least a portion of an image signature determined in step 310 of FIG. 3 with the reference attribute signature. For example, attributes of an image match a reference attribute signature if all of the components of a signature (e.g., determined in step 310 of FIG. 3) of the image match components of a single reference signature. The reference signature may be stored and/or obtained from a database of reference signatures such as a database stored in storage 108 of FIG. 1. In some embodiments, the reference signature is one of a plurality of references signatures compared to the attributes (e.g., using a signature) of the image. In some embodiments, determining whether attributes of the image match the reference attribute signature includes searching through a database, list, and/or grouping of reference signatures to find a reference signature that matches the attributes of the image. In some embodiments, the reference attribute signatures are searched from an identified set of reference signatures associated with a device manufacturer and/or model identified using a metadata of the image. For example, a model of a device used to generate the image is obtained from a metadata of the image and a set of reference signatures associated with the model and/or manufacturer of the model is obtained from a database of reference signatures. In this example, the obtained set of reference signatures is searched to locate a matching reference signature within the set.

If at 402 it is determined that attributes of the image match a reference attribute signature, at 404 it is determined that the image is likely an unmodified original image. In some embodiments, a result of the determination in 404 is provided at 210 of FIG. 1.

If at 402 it is determined that attributes of the image do not match a reference attribute signature, at 406 it is determined whether the attributes of the image are an imperfect match with one or more reference signatures. In some embodiments, determining whether the attributes of the image imperfectly match a reference signature includes determining whether one or more components of a signature (e.g., determined at 310 of FIG. 3) determined for the image match one or more components of one or more reference signatures. For example, reference signatures stored in a storage such as storage 108 of FIG. 1 are searched to identify one or more reference signatures that at least partially match one or more attributes (e.g., subcomponent(s) of a signature) of the image.

In some embodiments, one or more predetermined match patterns/rules specifying specific types of imperfect matches are used to search for an imperfect match. In some embodiments, a match pattern/rule may specify one or more attributes of the image that must match one or more components of one or more reference signatures to determine that a specific type of imperfect match has been found. For example, a match rule/pattern specifies the attributes of an image (e.g., represented as components of a signature of the image) that must match and/or not match specified component(s) of a specified number of reference signatures. A match rule/pattern may be associated with a specific insight (e.g., identifying information and reason that can be provided to a user) if a match for a specific match rule/pattern is found. In some embodiments, in order for a match rule/pattern to be satisfied, components of a plurality of reference signatures must match the match rule/pattern. In some embodiments, in order for a match rule/pattern to be satisfied, a specific attribute of an image could be found in any reference signature (e.g., within all reference signatures for a specific model and/or manufacturer of an image capture device) while another group of specific attributes must be found in a single reference signature.

In some embodiments, the match rule/pattern specifies whether a compression attribute of the image matches a known compression attribute of a known image editing software tool or service. For example, the match rule/pattern checks whether compression parameter values (e.g., a quantization table and Huffman code) associated with compression of the image match compression parameter values associated with a known software editing program and/or service. In some embodiments, a match rule/pattern specifies whether an unexpected value is found in a metadata tag of the image. In some embodiments, a match rule/pattern specifies whether a mismatch is found in a metadata date tag(s) of the image. In some embodiments, a match rule/pattern specifies whether a database storing reference signatures likely contains enough information to reliably determine whether an unmodified original image from an identified capture device can be identified. For example, the rule/pattern determines whether references signatures for a specific camera stored in a database are likely a complete set of reference signatures possible for the camera. In some embodiments, a match rule/pattern specifies whether an identified capture device of an image is associated with a highly variable number of reference signatures. For example, a camera may include a large number of camera settings that produce images with an extremely large number of different signatures and it may be difficult to obtain and/or determine a complete set of reference signatures for the camera.

In various embodiments, a plurality of match rules/patterns exists to determine an imperfect match. The match rules/patterns may be processed in a predetermined order and/or parallel to determine which, if any, matching rule produces a match. In some embodiments, match rules/patterns are processed as a database lookup. In some embodiments, match rules/patterns are processed using a decision tree/graph.

At 408, a result of the imperfect match analysis is provided. In some embodiments, if it is determined that the attributes of the image are an imperfect match with one or more reference signatures, an insight and/or reason associated with the imperfect match is provided. For example, if a specific match rule/pattern is found to be a match, an insight and/or reason associated with the matching rule is provided to a user to assist the user in determining whether the image is likely an unmodified original image. In some embodiments, step 408 is included in step 210 of FIG. 2. In some embodiments, if no match rule/pattern is satisfied, a result that it is difficult to determine the authenticity of the image is provided. In some embodiments, if no match rule/pattern is satisfied, a result that the image has been likely modified is provided.

FIG. 5 is a table outlining an example set of match rules/patterns used to perform imperfect match analysis. In some embodiments, the table of FIG. 5 is used in steps 406 and/or 408 of FIG. 4. FIG. 5 shows table 500 including a set of match rules/patterns to be processed sequentially. The match rules/patterns may be applied to an image (e.g., image received at 202 of FIG. 2) being analyzed to determine its authenticity. Each row represents a different match rule/pattern to be processed in sequential order. If a match rule/pattern is satisfied (i.e., reference signature(s) matching the match rule/pattern have been found), match rules/patterns after the satisfied match rule/pattern do not need to be processed. For example, each subsequent match rule/pattern assumes that the previous match rule/pattern has not been satisfied.

The first row specifying the first match rule/pattern specifies a "no" under the compression/any column. This identifies that if this matching rule is to be satisfied, any reference signature (e.g., from all reference signatures associated with model and/or manufacturer determined from metadata of the image being analyzed) must not match the compression attribute (e.g., attribute analyzed at 304 of FIG. 3) of the image being analyzed. For example, the quantization table and Huffman code of the image being analyzed must not match any quantization table and Huffman code identified in any reference signature (e.g., search may be limited to a specific manufacturer and/or camera model). The first row also specifies a "no" under the camera match column. This identifies that the signature of the image being analyzed must not match a reference signature for another camera/device by the same manufacturer. The first row also specifies a "yes" under the software match column. This identifies that the compression attribute (e.g., attribute analyzed at 304 of FIG. 3) of the image being analyzed must match a compression attribute associated with a known image editing software and/or service. For example, the quantization table and Huffman code of the image being analyzed must match a quantization table and Huffman code associated with a known image editing software and/or service. The compression attributes associated with a known image editing software and/or service may be stored in a database of reference signatures and/or a separate database. The first row also specifies a "yes" under the unexpected date column. This identifies that the signature of the image being analyzed must identify that a date associated with the creation of the image does not match a last edited date of the image. When all of the specified conditions of the matching rule specified in the first row are satisfied (conditions of columns with blank values are not relevant for the match rule/pattern of the row), an insight that the image being analyzed is probably a modified image is indicated with the reasoning that the image compression matches a known software application and there is an unexpected EXIF modification date. If the conditions of the first row are satisfied in the imperfect match search, subsequent matching rules do not need to be analyzed. Otherwise, the next row is processed.

The second row specifies a "no" under the compression/any column, "no" under the camera match column, and "yes" under the software match column in the same manner as the first row. The second row also specifies "yes" under the unexpected CreatorTool column. This identifies that the signature of the image being analyzed must identify that unknown value and/or a value associated with an image editing software/service is stored as a value of the metadata CreatorTool tag of the image being analyzed. When all of the specified conditions of the match rule/pattern specified in the second row are satisfied, an insight that the image being analyzed is probably a modified image is indicated with the reasoning that the image compression matches a known software application and there is an unexpected EXIF CreatorTool. If the conditions of the second row are not satisfied in the search, the next row is processed.

The third row specifies a "no" under the compression/any column, "no" under the camera match column, and "yes" under the software match column in the same manner as the first row. When all of the specified conditions of the match rule/pattern specified in the third row are satisfied, an insight that the image being analyzed may be a modified image is indicated with the reasoning that the image compression matches no known reference signature, but does match a compression of a known image editing software application. If the conditions of the third row are not satisfied in the search, the next row is processed.

The fourth row specifies "one" under the # of signatures column. This specifies that in order for this match rule/pattern to be satisfied, at least one single reference signature with all of the criteria specified in the row under the "same" column (i.e., dimension, compression, and thumbnail must all match in a single reference signature) must be found. The fourth row also specifies "yes" under the dimension/same column. This identifies that if this match rule/pattern is to be satisfied, a reference signature must match the dimension attribute (e.g., attribute analyzed at 302 of FIG. 3) of the image being analyzed. For example, the pixel dimensions of the image being analyzed must match the pixel dimensions identified in the reference signature.

The fourth row also specifies "yes" under the compression/same column. This identifies that if this match rule/pattern is to be satisfied, a reference signature must match the compression attribute (e.g., attribute analyzed at 304 of FIG. 3) of the image being analyzed. For example, the quantization table and Huffman code of the image being analyzed must match the quantization table and Huffman code identified in the reference signature.

The fourth row also specifies "yes" under the thumbnail/same column. This identifies that if this match rule/pattern is to be satisfied, a reference signature must match the thumbnail attribute (e.g., attribute analyzed at 306 of FIG. 3) of the image being analyzed. For example, the pixel dimensions and the quantization table and Huffman code of the thumbnail of the image being analyzed must match the thumbnail pixel dimensions and the thumbnail quantization table and Huffman code identified in the reference signature.

The fourth row also specifies "yes" under the metadata/any column. This identifies that if this match rule/pattern is to be satisfied, any reference signature (e.g., from all reference signatures associated with model and/or manufacturer determined from metadata of the image being analyzed) must match the metadata attribute (e.g., attribute analyzed at 308 of FIG. 3) of the image being analyzed. For example, the metadata of the image being analyzed must match any metadata identified in any reference signature for a camera (e.g., search may be limited to a specific manufacturer and/or camera model).

The fourth row also specifies a "no" under the unexpected date column. This identifies that the signature of the image being analyzed must identify that a date associated with the creation of the image does match a last edited date of the image. When all of the specified conditions specified in the fourth row are satisfied, an insight that the image being analyzed is likely an untouched original image is indicated with the reasoning that a single reference signature matched on all but metadata components and a match for metadata component was found in another reference signature. If the conditions of the fourth row are satisfied in the search, subsequent matching rules do not need to be analyzed. Otherwise, the next row is processed.

Like the fourth row, the fifth row specifies "one" under # of signatures column, "yes" under dimension/same column, "yes" under compression/same column, "yes" under thumbnail/same column, and "no" under the unexpected date column. When all of the specified conditions specified in the fifth row are satisfied, an insight that the image being analyzed is likely an untouched original image is indicated with the reasoning that a single reference signature matched on all but metadata components. If the conditions of the fifth row are satisfied in the search, subsequent matching rules do not need to be analyzed. Otherwise, the next row is processed.

The sixth row specifies "one" under # of signatures column, "yes" under dimension/same column, "yes" under compression/same column, and "no" under camera match column. When all of the specified conditions of the matching rule specified in the sixth row are satisfied, an insight that the image being analyzed may be an unmodified original that was touched by a photo management application is indicated with the reasoning that a single reference signature matched for both image dimension and compression components. If the conditions of the sixth row are satisfied in the search, subsequent matching rules do not need to be analyzed. Otherwise, the next row is processed.

The seventh row specifies "one" under # of signatures column, "yes" under dimension/same column, "yes" under thumbnail/same column, "yes" under metadata/same column, and "no" under the unexpected date column. The seventh row also specifies "yes" under the compression/any column. This identifies that if this match rule/pattern is to be satisfied, any reference signature (e.g., from all reference signatures associated with model and/or manufacturer determined from metadata of the image being analyzed) must match the compression attribute (e.g., attribute analyzed at 304 of FIG. 3) of the image being analyzed. For example, the quantization table and Huffman code of the image being analyzed must match a quantization table and Huffman code identified in any reference signature for a camera (e.g., search may be limited to a specific manufacturer and/or camera model). The seventh row also specifies "yes" under the dynamic column. This identifies that if this matching rule is to be satisfied, the device identified as having been used to generate the image is associated with a highly variable number of reference signatures. It may be determined that a camera produces a highly variable number of reference signatures if a number of reference signatures associated with a camera/device meets/exceeds a predetermined number of reference signatures. It may be determined that a camera/device produces a highly variable number of reference signatures if the device is specified as such in a database of reference signatures. When all of the specified conditions of the seventh row are satisfied, an insight that the image may be an untouched original image is indicated with the reasoning that though the exact signature match was not found, signatures for the associated camera/device are highly variable, and the signature for the image being analyzed seems plausible to be associated with an unmodified image. If the conditions of the seventh row are satisfied in the search, subsequent matching rules do not need to be analyzed. Otherwise, the next row is processed.

The eighth row specifies "one" under # of signatures column, "yes" under compression/same column, "yes" under thumbnail/same column, and "no" under camera match column. The eighth row also shows "no" under the dimension/any column. This identifies that if this match rule/pattern is to be satisfied, any reference signature (e.g., from all reference signatures associated with model and/or manufacturer determined from metadata of the image being analyzed) must not match the dimension attribute (e.g., attribute analyzed at 302 of FIG. 3) of the image being analyzed. For example, the pixel dimensions of the image being analyzed must not match the pixel dimensions identified in any reference signature for a camera (e.g., search may be limited to a specific manufacturer and/or camera model). The eighth row also specifies "yes" under the reliable column. This identifies that if this match rule/pattern is to be satisfied, there exists reliable coverage of reference signatures for the camera/device identified as having been used to generate the image. It may be determined that the coverage for the camera/device is reliable if it is determined that all currently possible reference signatures for the camera/device have been obtained and stored in a database. When all of the specified conditions of the eighth row are satisfied, an insight that the image may have been cropped is indicated with the reasoning that a single signature matches both compression and thumbnail, but not dimension, and there is relatively complete reference signature coverage for this camera in the signature database. If the conditions of the eighth row are satisfied in the search, subsequent matching rules do not need to be analyzed. Otherwise, the next row is processed.

The ninth row specifies "one" under # of signatures column, "yes" under dimension/same column, "yes" under thumbnail/same column, "yes" under metadata/same column, "no" under camera match column, "no" under expected date column, and "yes" under dynamic column. When all of the specified conditions of the ninth row are satisfied, an insight that it is difficult to draw a conclusion is indicated with the reasoning that the image signature matches on all but the compression component, and the camera/device is known to be associated with a highly variable number of reference signatures. If the conditions of the ninth row are satisfied in the search, subsequent matching rules do not need to be analyzed. Otherwise, the next row is processed.

The tenth row specifies "all" under # of signatures column. This specifies that in order for this match rule/pattern row to be satisfied, all reference signatures in the database for the identified camera/device used to generate the image being analyzed must satisfy the criteria specified in the row under the "same" column (i.e., dimension and compression must not match in all reference signatures for the camera). The tenth row specifies "no" under dimension/same column and "no" under compression/same column. This indicates that dimension and compression attributes of the image must not match any reference signature for the camera/device identified in metadata of the image being analyzed. The tenth row also specifies "no" under camera match column and "yes" under the reliable column. When all of the specified conditions of the tenth row are satisfied, an insight that the image being analyzed may be a modified image is indicated with the reasoning that no known reference signature matches both dimension and compression components and there is relatively complete reference signature coverage for the identified camera/device of the image. If the conditions of the tenth row are satisfied in the search, subsequent matching rules do not need to be analyzed. Otherwise, the next row is processed.

The eleventh row specifies "yes" under the camera match column. This specifies that in order for this match rule row to be satisfied, a reference signature that matches the attributes of the image being analyzed is found under a different camera/device model of the same manufacturer of the model/device identified in the metadata of the image. The eleventh row also specifies "no" under the unexpected date column. When all of the specified conditions of the eleventh row are satisfied, an insight that the image being analyzed may be a unmodified original image is indicated with the reasoning that although an exact reference signature match has not been found for an identified camera, an exact reference signature match was found for a different camera from the same manufacturer of the identified camera. If the conditions of the eleventh row are satisfied in the search, subsequent matching rules do not need to be analyzed. Otherwise, the next row is processed.

The twelfth row specifies "no" under the reliable column. This specifies that an identified camera for the image being analyzed is not associated with a reliable reference signature coverage in a reference signature database. When all of the specified conditions of the matching rule specified in the twelfth row are satisfied, an insight that a conclusion is difficult to determine is indicated with the reasoning that reference database coverage for an identified camera is incomplete to determine a definitive insight. If the conditions of the twelfth row are satisfied in the search, subsequent matching rules do not need to be analyzed. Otherwise, the next row is processed.

The thirteenth row specifies "yes" under the reliable column. If this final matching rule row has been reached, an insight that a conclusion is difficult to determine is indicated with the reasoning that results of the signature analysis do not follow any typical patterns.

Figure 6:
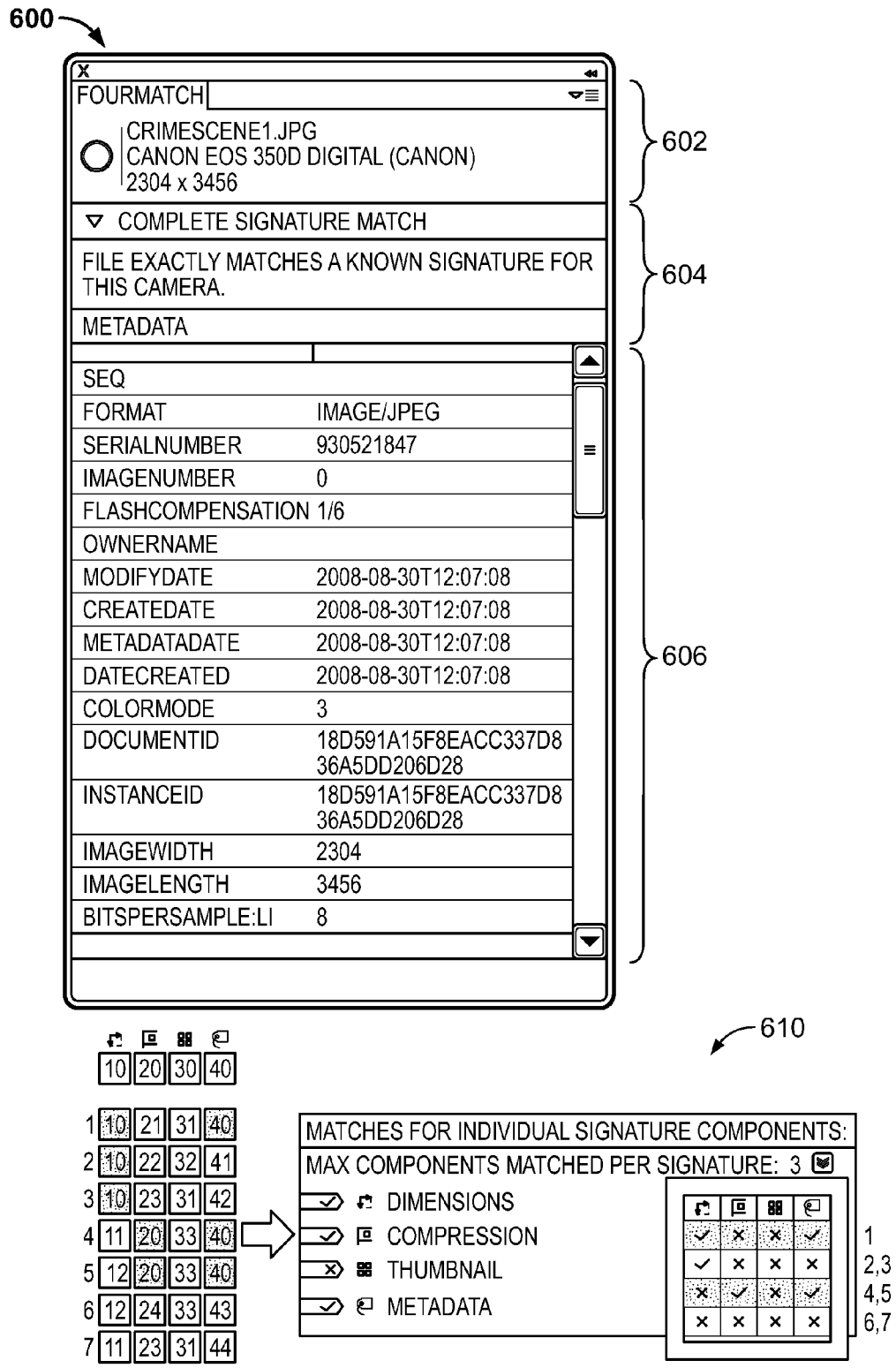
FIG. 6 is a diagram illustrating an embodiment of a user interface displaying image analysis information.

FIG. 6 is a diagram illustrating an embodiment of a user interface displaying image analysis information. In some embodiments, display window 600 displays a result of analyzing an image for authenticity. Window 600 may be provided by client 102 of FIG. 1. Window 600 may be provided as a plug-in (e.g., Photoshop (R) plugin, on a webpage, as a standalone software, and/or a software service). In some embodiments, display window 600 can be used to display information to be provided in 210 of FIG. 2 and/or 408 of FIG. 4. Window 600 includes results region 602, details region 604, and metadata region 606.

Results region 602 may display a green, yellow, or red light icon that indicates whether a matching reference signature has been found in the database. A green icon may indicate that a signature for the image exactly matches a reference signature for the camera/device identified in the metadata of the image. A yellow icon may indicate that a signature for the image could not be matched to a known reference signature for the camera/device identified in the metadata of the image. A red icon may indicate that the image does not include camera identification metadata and could not be matched to a reference signature. Next to the light is a listing of the current filename of the image, the camera/device (e.g., obtained from image metadata) used to capture the image (if available), and the image dimensions.

Details region 604 displays additional details about the image analysis. It displays a summary of the analysis and further clues as to the possible editing history of the image if a matching reference signature was not found. The amount of information displayed within this region might vary from image to image. The first line of the Details region is the Verdict bar, which displays a short explanation of why the image received a green, yellow, or red icon. A user may select the triangle at the left of the Verdict bar to expand/collapse the full Details region.

The Details region may contain a box for matches of individual signature properties (e.g., present for yellow state only). Even when a complete signature match is not found, individual components of the image signature may find matches in the signature database. The Matches box presents information on whether matches were found for any of the four signature components—Dimensions, Compression, Thumbnail, and Metadata. If a component matches at least one signature of the same camera make and model, then the component will be tagged with a green tab and a checkmark; otherwise the component will be tagged with a grey tab and an "x."

In some cases, it's possible to find matches for all four signature components, though they will not all match against the same signature in the database. To view how the components matched against individual reference signatures, a button at the top right of the Matches box may be selected. A pop-up grid such as the grid shown in example 610 will appear in which each row represents one or more camera signatures that returned the same set of results when matching against the image signature. This allows a user to easily view whether there are signatures that matched against one, two, or three components, and which components these were.

Example 610 illustrates a chart for an image with a value of "10" for Dimensions, "20" for Compression, "30" for Thumbnail, and "40" for Metadata. (Note that these are not real values, but are used for illustration purposes only. The actual values for each of these properties are much more complex.) The table below these values shows that there were seven signatures found in the database for the camera that captured this image. Where the value of one of the signature properties matches the image, it is marked in green. Otherwise, it is marked in red. None of the seven signatures are a perfect match for the image, and thus none of the rows in the table display a complete set of green boxes. The main part of the Matches box indicates whether there are matches for each of the properties of the image among any of the signatures for the identified camera/device in the database. Thus, these results are generated by looking for a green square (a match) in any column of the table. In the example shown, there is at least one green square in the Dimensions, Compression, and Metadata columns, but none in the Thumbnail column, resulting in corresponding checks in the Matches box. The pop-up signature grid displays more detailed information about how the image properties were matched. It indicates which properties could be matched across a single signature. Because it doesn't display the actual values of the non-matching properties, several rows in the signature table get collapsed into one. Thus, in this example, signatures 2 and 3 get collapsed into the second row, and signatures 4 and 5 get collapsed into the third row. These two pairs of signatures each match the same properties on the image file, and they differ only in the properties that are not matched.

Details region 604 may also display known valid dimensions of the image. If the image dimensions do not match any signature in the database, then a list of known valid dimensions will be displayed under the Dimensions component. This may provide some insight into how the image was cropped from its original resolution.

Details region 604 may also display compression matches of known sources. If the image compression settings match a photo editing software or on-line service, then this product or service will be displayed under the Compression component. Though this may sometimes indicate that the image has been edited, there are also isolated instances where a camera shares the same compression settings with a software application or an online service.

Details region 604 may also display whether an unexpected value is detected in the EXIF CreatorTool value. If the value stored in the EXIF tag "CreatorTool" is not one that is associated with the camera that captured the image, then a warning is displayed under Metadata. Many photo editing applications will insert or overwrite this EXIF field with the name of the software. This information may indicate which application or service last touched the image file.

Details region 604 may also display an Insight box that deduces the potential editing history of the image based on the information revealed in the Matches box and several other factors. This insight may indicate whether the image is more likely an unaltered original image or an edited version.

Details region 604 may also warn of the possibility of an unexpected modification time. If the EXIF modification date does not match the creation date, the creation time and the modification time may be displayed. Typically, when an image is captured, the EXIF metadata will store the same values for the creation date and the modification date. Photo editing software will often overwrite the modification date at the time the image was resaved, so a difference in these dates may indicate that the image was modified.

Details region 604 may also warn when a signature match has not been found for the camera named in the image's EXIF metadata. Details region 604 may list any other cameras that have signatures that match the image being analyzed. When a match is found for another camera by the same manufacturer, this can sometimes be an indication that the image failed to return a green state simply because the database does not have a full set of signatures for the camera that captured the image.

Metadata region 606 presents a scrollable list of all of the EXIF metadata stored in the image file. This metadata display may not be filtered or analyzed and is instead presented in as unprocessed a manner as possible to view the metadata in the exact state.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for evaluating an image, comprising:
   a processor configured to
      analyze a plurality of attributes of the image, wherein the plurality of attributes includes attributes belonging to a plurality of different attribute categories,
      determine that a portion of the attributes imperfectly matches a reference attribute signature corresponding to a device, wherein determining that the portion of the attributes imperfectly matches the reference attribute signature includes determining that an image signature determined using at least a first identifier of a first attribute of the plurality of attributes of the image belonging to a first attribute category and a second identifier of a second attribute of the plurality of attributes of the image belonging to a second attribute category matches only in part the reference attribute signature associated with the device, and
      distinguish whether the imperfect match likely corresponds to a modification; and
   a memory coupled to the processor and configured to provide the processor with instructions.

2. The system of claim 1, wherein distinguishing whether the imperfect match likely corresponds to the modification includes determining whether the imperfect match is a consequence of a reference attribute signature database coverage for the device.

3. The system of claim 1, wherein distinguishing whether the imperfect match likely corresponds to the modification includes determining whether the imperfect match is a consequence of a variability of possible reference attribute signatures for the device.

4. The system of claim 1, wherein distinguishing whether the imperfect match likely corresponds to the modification includes determining whether a compression of the image corresponds to an image editing software compression.

5. The system of claim 1, wherein distinguishing whether the imperfect match likely corresponds to the modification includes providing an identifier of a degree of confidence that the image has not been modified.

6. The system of claim 1, wherein distinguishing whether the imperfect match likely corresponds to the modification includes providing information identifying a reason the portion of the attributes imperfectly matches the reference attribute signature.

7. The system of claim 1, wherein the modification includes a resaving of the image after the image was saved by the device.

8. The system of claim 1, wherein analyzing the plurality of attributes of the image includes analyzing a dimension of the image.

9. The system of claim 1, wherein analyzing the plurality of attributes of the image includes analyzing a compression parameter of the image.

10. The system of claim 1, wherein analyzing the plurality of attributes of the image includes analyzing a thumbnail of the image.

11. The system of claim 1, wherein analyzing the plurality of attributes of the image includes analyzing a metadata of the image.

12. The system of claim 1, wherein analyzing the plurality of attributes of the image includes determining a signature that represents one or more of the plurality of attributes of the image.

13. The system of claim 1, wherein analyzing the plurality of attributes of the image includes determining whether the image has been compressed more than one time.

14. The system of claim 1, wherein determining that the portion of the attributes imperfectly matches the reference attribute signature includes determining that the image signature does not completely match any single reference attribute signature in a reference attribute signature database, and in response to the determination that the image signature does not completely match any single reference attribute signature, searching the reference attribute signature database to identify the reference attribute signature that imperfectly matches the image signature.

15. The system of claim 1, wherein determining that the portion of the attributes imperfectly matches the reference attribute signature includes searching through a group of reference attribute signatures and each of the group of reference attribute signatures identify device model common attributes of all devices of a same device model.

16. The system of claim 1, wherein determining that the portion of the attributes imperfectly matches the reference attribute signature includes searching through a group of reference attribute signatures known to be associated with device models of a same device manufacturer to identify the imperfectly matched reference attribute signature.

17. The system of claim 1, wherein determining that the portion of the attributes imperfectly matches the reference attribute signature includes utilizing a match pattern specifying specific attribute category components of the image signature that must match the reference attribute signature in order for the imperfect match to be determined.

18. The system of claim 1, wherein determining that the portion of the attributes imperfectly matches the reference attribute signature includes utilizing a match pattern specifying the portion of the attributes that must explicitly not match the reference attribute signature in order for the imperfect match to be determined.

19. A method for evaluating an image, comprising:
analyzing a plurality of attributes of the image, wherein the plurality of attributes includes attributes belonging to a plurality of different attribute categories;
using a processor to determine that a portion of the attributes imperfectly matches a reference attribute signature corresponding to a device, wherein determining that the portion of the attributes imperfectly matches the reference attribute signature includes determining that an image signature determined using at least a first identifier of a first attribute of the plurality of attributes of the image belonging to a first attribute category and a second identifier of a second attribute of the plurality of attributes of the image belonging to a second attribute category matches only in part the reference attribute signature associated with the device; and
distinguishing whether the imperfect match likely corresponds to a modification.

20. A computer program product for evaluating an image, the computer program product being embodied in a tangible computer readable storage medium and comprising computer instructions for:
analyzing a plurality of attributes of the image, wherein the plurality of attributes includes attributes belonging to a plurality of different attribute categories;
determining that a portion of the attributes imperfectly matches a reference attribute signature corresponding to a device, wherein determining that the portion of the attributes imperfectly matches the reference attribute signature includes determining that an image signature determined using at least a first identifier of a first attribute of the plurality of attributes of the image belonging to a first attribute category and a second identifier of a second attribute of the plurality of attributes of the image belonging to a second attribute category matches only in part the reference attribute signature associated with the device; and
distinguishing whether the imperfect match likely corresponds to a modification.

21. The method of claim 19, wherein distinguishing whether the imperfect match likely corresponds to the modification includes providing an identifier of a degree of confidence that the image has not been modified.

22. The method of claim 19, wherein distinguishing whether the imperfect match likely corresponds to the modification includes providing information identifying a reason the portion of the attributes imperfectly matches the reference attribute signature.

23. The method of claim 19, wherein analyzing the plurality of attributes of the image includes analyzing a compression parameter of the image.

24. The method of claim 19, wherein analyzing the plurality of attributes of the image includes analyzing a metadata of the image.

25. The computer program product of claim 20, wherein analyzing the plurality of attributes of the image includes analyzing a metadata of the image.

\* \* \* \* \*